(12) United States Patent
Kim

(10) Patent No.: US 9,755,239 B2
(45) Date of Patent: Sep. 5, 2017

(54) COMPOSITION FOR POSITIVE ELECTRODE OF LITHIUM SECONDARY BATTERY AND LITHIUM SECONDARY BATTERY USING SAME

(71) Applicant: Samsung SDI Co., Ltd., Yongin-si, Gyeonggi-do (KR)

(72) Inventor: Dae-Sik Kim, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 641 days.

(21) Appl. No.: 13/790,109

(22) Filed: Mar. 8, 2013

(65) Prior Publication Data

US 2014/0127563 A1    May 8, 2014

(30) Foreign Application Priority Data

Nov. 5, 2012 (KR) .................. 10-2012-0124312

(51) Int. Cl.
*H01M 10/052* (2010.01)
*H01M 4/62* (2006.01)
*H01M 4/13* (2010.01)

(52) U.S. Cl.
CPC .............. *H01M 4/62* (2013.01); *H01M 4/13* (2013.01); *H01M 10/052* (2013.01)

(58) Field of Classification Search
CPC ............................. H01M 4/131; H01M 4/133
See application file for complete search history.

(56) References Cited

U.S. PATENT DOCUMENTS

| 4,744,916 A | 5/1988 | Adams et al. |
| 5,382,481 A * | 1/1995 | Fleischer ............... H01G 9/025 429/213 |
| 6,200,703 B1 | 3/2001 | Kashio et al. |
| 7,829,219 B2 | 11/2010 | Yun et al. |
| 2008/0008928 A1 * | 1/2008 | Partin ................. H01M 2/0285 429/61 |

(Continued)

FOREIGN PATENT DOCUMENTS

| JP | 10-106579 | 4/1998 |
| JP | 10-208729 A | 8/1998 |
| JP | 2000-090917 | 3/2000 |

(Continued)

OTHER PUBLICATIONS

Office Action issued Jun. 28, 2016 in corresponding Korean Application No. 10-2012-0124312.

*Primary Examiner* — Olatunji Godo
(74) *Attorney, Agent, or Firm* — Knobbe Martens Olson & Bear LLP

(57) ABSTRACT

Disclosed is a positive electrode composition for a lithium secondary battery and a secondary lithium battery using the same. The positive electrode composition for a lithium secondary battery includes a positive active material, a binder, and a compound represented by the following Chemical Formula 1.

[Chemical Formula 1]

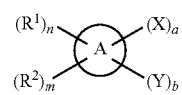

The above Chemical Formula 1 is the same as defined in the detailed description.

18 Claims, 1 Drawing Sheet

(56) References Cited

U.S. PATENT DOCUMENTS

2010/0248041 A1* 9/2010 Kikuchi .................. C01B 31/02
429/342

FOREIGN PATENT DOCUMENTS

| KR | 1987-0001301 A | 3/1987 |
| KR | 1997-0054750 A | 7/1997 |
| KR | 10-0643631 | 11/2006 |

* cited by examiner

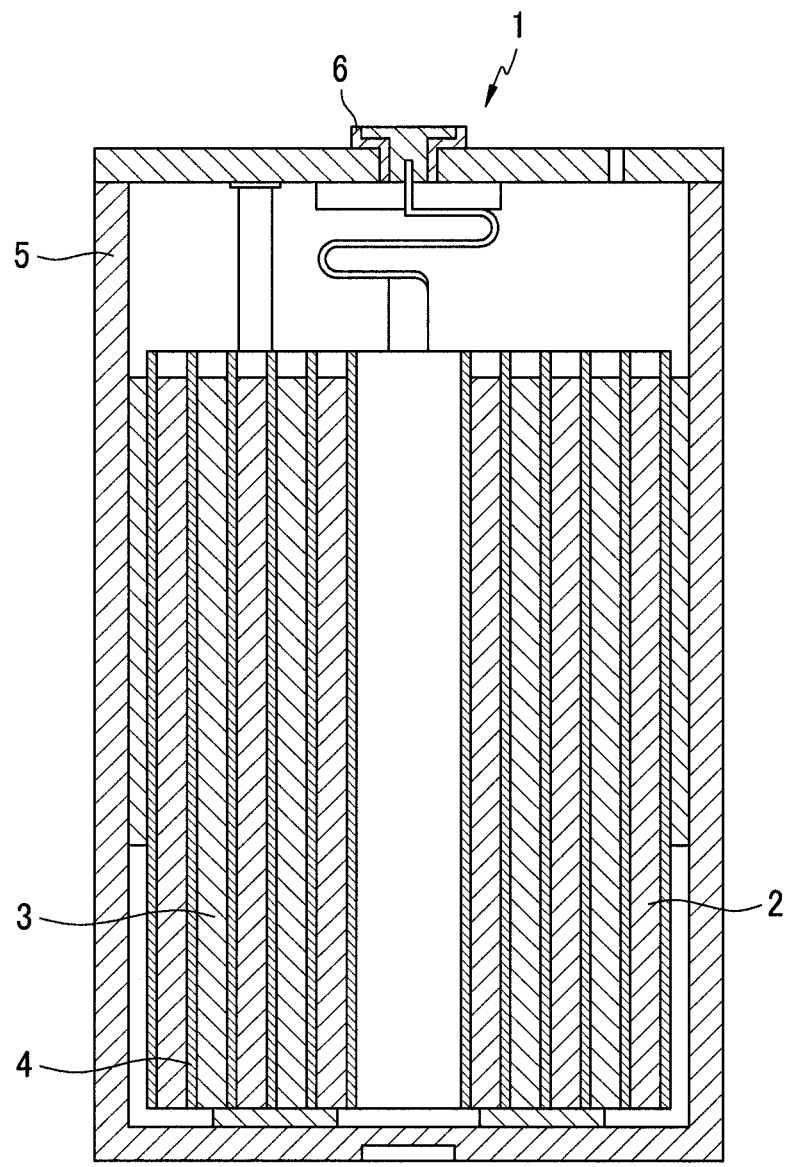

COMPOSITION FOR POSITIVE ELECTRODE OF LITHIUM SECONDARY BATTERY AND LITHIUM SECONDARY BATTERY USING SAME

CROSS-REFERENCE TO RELATED APPLICATIONS

This application claims priority to and the benefit of Korean Patent Application No. 10-2012-0124312 filed in the Korean Intellectual Property Office on Nov. 5, 2012, the entire contents of which are incorporated herein by reference.

BACKGROUND

Field

A positive electrode composition for a lithium secondary battery and a lithium secondary battery using the same are disclosed.

Description of the Related Technology

Secondary batteries have been increasingly demanded in accordance with technology development and demand for portable devices. In particular, secondary batteries with high energy density and high voltage have been commercially available and widely used.

In general, lithium secondary batteries generate energy by intercalating and deintercalating lithium ions during the charge and discharge. The lithium secondary batteries basically include a negative electrode including a negative active material, a positive electrode including a positive active material, a separator, and an electrolyte including an organic solvent. As for the negative active material, a tin or silicon-based composite material has recently drawn attention.

The positive active material for a lithium secondary battery may include lithium-containing metal oxide such as $LiCoO_2$, $LiMn_2O_4$, $LiNiO_2$, $LiMnO_2$, and the like, while the negative active material may include a lithium metal or an alloy thereof, a carbon material, and the like. The positive or negative active material for a lithium secondary battery is not basically conductive.

Accordingly, the active material particles are coated with a conductive agent the surface thereof in order to form a conductive network and increase conductivity.

The positive electrode for a lithium secondary battery is fabricated by mixing a positive active material, a binder, and a conductive agent in an organic solvent and dispersing the mixture to prepare positive electrode slurry composition, coating the positive electrode slurry composition on a positive current collector, and then, drying and compressing the coated current collector.

The binder is used to improve adherence among positive active material particles or the positive active material particles to the positive current collector. When the positive electrode slurry is dried on the positive current collector, the binder existing among the positive active material particles or between the positive active material particles and the current collector is transformed from a liquid to a solid and has adherence.

However, when polymers consisting of the binder are cross-linked in the slurry, the slurry becomes gelated. The gelation illustrates a phenomenon that slurry is transformed from sol to gel. This gelation makes to difficult to uniformly coat the slurry on the current collector and, if ever, decreases adherence among the particles or of the particles to the current collector. The deteriorated adherence among the particles may cause detachment of the particles from the surface of the positive electrode and resultantly deteriorate battery safety. In other words, the particles detached from the positive electrode due to the insufficient adherence may cause a microshort inside a battery and deteriorate battery performance.

Furthermore, some large microshorts may cause a short circuit and set a fire. In addition, when the adherence of the particles to the current collector is deteriorated, electrons may have resistance during the movement from the particles to the current collector, which may decrease an electrical conductivity rate and resultantly, deteriorate high rate capability and cycle-life characteristics. Furthermore, when the particles coated to be hundreds of micrometer(μm)-thick on the current collector are pressed after coating the slurry, the particles lack of adherence and stick to a constantly-rolling roll and may cause a surface defect or an electrode defect due to overpressure, decreasing a manufacturing process yield.

SUMMARY OF CERTAIN INVENTIVE ASPECTS

One embodiment provides a positive electrode composition for a lithium secondary battery preventing gelation of positive electrode slurry and improving adherence of a positive active material and thus, safety and high rate capability and cycle-life characteristics of a lithium secondary battery and a yield during the fabrication of the lithium secondary battery. Another embodiment provides a lithium secondary battery fabricated using the same.

According to one embodiment, a positive electrode composition for a lithium secondary battery includes a positive active material, a binder and compound represented by the following Chemical Formula 1.

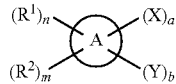

[Chemical Formula 1]

In Chemical Formula 1, A is a $C_3$ to $C_{30}$ cyclic organic group. X is —C(═O)R, wherein R is hydrogen, deuterium, a substituted or unsubstituted $C_1$ to $C_{10}$ alkyl group, a substituted or unsubstituted $C_3$ to $C_{10}$ cycloalkyl group, a substituted or unsubstituted $C_6$ to $C_{30}$ aryl group, or a substituted or unsubstituted $C_3$ to $C_{30}$ heteroaryl group.

Y is a substituent capable of forming a hydrogen bond, —OH, —NHR', —NH(C═O)R'' or —NH(C═S)R''', wherein R', R'', and R''' are independently hydrogen, deuterium, a substituted or unsubstituted $C_1$ to $C_{10}$ alkyl group, a substituted or unsubstituted $C_3$ to $C_{10}$ cycloalkyl group, a substituted or unsubstituted $C_6$ to $C_{30}$ aryl group, or a substituted or unsubstituted $C_3$ to $C_{30}$ heteroaryl group.

$R^1$ and $R^2$ are independently hydrogen, deuterium, a halogen, a cyano group, a nitro group, a substituted or unsubstituted $C_1$ to $C_{10}$ amine group, a substituted or unsubstituted $C_1$ to $C_{10}$ alkyl group, a substituted or unsubstituted $C_1$ to $C_{10}$ alkoxy group, a substituted or unsubstituted $C_2$ to $C_{10}$ alkenyl group, a substituted or unsubstituted $C_3$ to $C_{10}$ cycloalkyl group, a substituted or unsubstituted $C_6$ to $C_{30}$ aryl group, a substituted or unsubstituted $C_6$ to $C_{20}$ arylamine group, a substituted or unsubstituted $C_5$ to $C_{20}$ heteroarylamine group, or a substituted or unsubstituted $C_2$ to $C_{30}$ heteroaryl group, and $R^1$ and $R^2$ are linked to each other to form a fused ring.

1≤a, 1≤b, 0≤n, and 0≤m, provided that n+m+a+b does not exceed valence of A.

X is —C(=O)R wherein R may be a $C_1$ to $C_{10}$ alkyl group in which at least one hydrogen is substituted with a halogen group.

Y may be positioned at an alpha position relative to X.

Y is a substituent capable of forming a hydrogen bond, —OH, —NHR', —NH(C=O)R" or —NH(C=S)R'", wherein R', R", and R'" are independently a $C_1$ to $C_{10}$ alkyl group in which at least one hydrogen is substituted with a halogen group.

The $C_3$ to $C_{30}$ cyclic organic groups may be selected from an aromatic monocyclic organic group, an aromatic multicyclic organic group, an aromatic hetero monocyclic organic group, an aromatic hetero multicyclic organic group, an aliphatic monocyclic organic group, an aliphatic multicyclic organic group, an aliphatic hetero monocyclic organic group, an aliphatic hetero multicyclic organic group; an organic group including the foregoing cyclic groups linked by condensation; and an organic group including the foregoing cyclic groups linked through a linking group.

The $C_3$ to $C_{30}$ cyclic organic groups may be selected from a phenyl group, a naphthyl group, an anthracenyl group, a naphtacenyl group, a chrysenyl group, a perylenyl group, a coronenyl group, a corannulenyl group, a phenanthrenyl group, a furanyl group, a pyrrolyl group, a pyridinyl group, a pyrimidinyl group, a pyrazolyl group, an imidazolyl group, an oxazolyl group, an isoxazolyl group, an isothiazolyl group, a thiazolyl group, and an indolyl group.

The compound represented by the above Chemical Formula 1 may be one of compounds represented by Chemical Formulae 2 to 9.

[Chemical Formula 2]

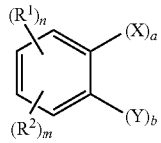

[Chemical Formula 3]

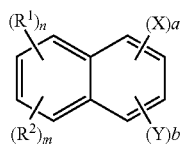

[Chemical Formula 4]

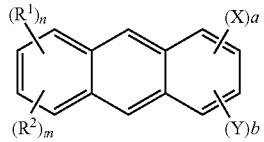

[Chemical Formula 5]

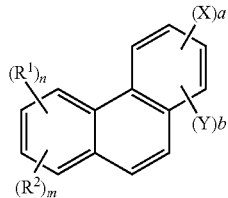

[Chemical Formula 6]

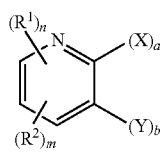

[Chemical Formula 7]

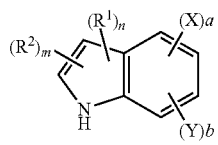

[Chemical Formula 8]

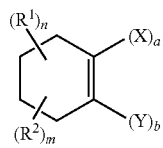

[Chemical Formula 9]

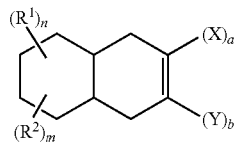

In Chemical Formulae 2 to 9, X, Y, $R^1$, $R^2$, a, b, n, and m are the same as defined above.

The compound represented by the above Chemical Formula 1 may be included in an amount of about 0.01 wt % to about 5 wt % based on 100 wt % of the positive electrode composition for a lithium secondary battery. Specifically, the compound may be included in an amount of about 0.01 wt % to about 1 wt %.

The positive electrode composition for a lithium secondary battery may further include a conductive material.

The conductive material may include at least one selected from natural graphite, artificial graphite, carbon black, acetylene black, ketjen black, a carbon fiber, carbon nanotube, a metal powder, a metal fiber and a conductive polymer.

The positive active material may have a layered structure, a spinel-based structure, an olivine-based structure, or a combination thereof.

The positive active material may include at least one selected from lithium cobalt-based oxide, lithium nickel cobalt manganese-based oxide, lithium nickel cobalt aluminum-based oxide, and lithium phosphate-based oxide.

The positive active material may be nickel-containing lithium metal composite oxide, and the lithium metal composite oxide may include nickel in an amount of greater than or equal to 60 mol %.

The binder may include carboxylmethylcellulose, hydroxyethylcellulose, hydroxypropylcellulose, hydroxypropylmethylcellulose, polyvinylidene fluoride, polytetrafluoroethylene, polyethylene, polypropylene, styrene-butadiene a rubber, polybutadiene, a butyl rubber, a fluorine rubber, polyethyleneoxide, polyvinylalcohol, poly(meth)acrylic acid and a salt thereof, polyvinylpyrrolidone, polyepichlorohydrine, polyphosphazene, polyacrylonitrile, polystyrene, polyvinylpyridine, chlorosulfonated polyethylene, a latex, a polyester resin, an acrylic resin, a phenol resin, an epoxy resin, a polymer of propylene and $C_2$ to $C_8$ olefin, a copolymer of (meth)acrylic acid and (meth)acrylic acid alkylester, and a combination thereof.

According to another embodiment, a lithium secondary battery includes a positive electrode including a current collector and the positive electrode composition for a lithium secondary battery disposed on at least one side of the current collector; a negative electrode including a negative active material; a separator interposed between the positive electrode and negative electrode; and an electrolyte.

Accordingly, the present embodiments provide a positive electrode composition for a lithium secondary battery preventing gelation of positive slurry and improving adherence of a positive active material and thus, improving safety and high input and output and cycle-life characteristics of a lithium secondary battery and a yield during the fabrication of the lithium secondary battery.

BRIEF DESCRIPTION OF THE DRAWINGS

The FIGURE is a schematic view showing a lithium secondary battery according to one embodiment.

DETAILED DESCRIPTION OF CERTAIN INVENTIVE EMBODIMENTS

An example embodiment of this disclosure will hereinafter be described in detail. However, the embodiment is only an example, and this disclosure is not limited thereto.

As used herein, when specific definition is not otherwise provided, the term "substituted" refers to one substituted with a $C_1$ to $C_{30}$ alkyl group; a $C_1$ to $C_{10}$ alkylsilyl group; a $C_3$ to $C_{30}$ cycloalkyl group; a $C_6$ to $C_{30}$ aryl group; a $C_2$ to $C_{30}$ heteroaryl group; a $C_1$ to $C_{10}$ alkoxy group; a fluoro group, a $C_1$ to $C_{10}$ trifluoroalkyl group such as a trifluoromethyl group; or a cyano group, instead of hydrogen of a compound.

As used herein, when specific definition is not otherwise provided, the term "hetero" refers to one including 1 to 3 hetero atoms selected from the group consisting of N, O, S, and P, and remaining carbons in one functional group.

In the specification, when a definition is not otherwise provided, the term "alkyl group" may refer to "a saturated alkyl group" without any alkene group or alkyne group. The alkyl group may be branched, linear, or cyclic.

The alkyl group may be a $C_1$ to $C_{20}$ alkyl group, for example a $C_1$ to $C_{10}$ alkyl group. Specifically, the alkyl group may be a $C_1$ to $C_6$ lower alkyl group, a $C_7$ to $C_{10}$ intermediate alkyl group, or a $C_{11}$ to $C_{20}$ higher alkyl group.

For example, a $C_1$ to $C_4$ alkyl group may have 1 to 4 carbon atoms and may be selected from the group consisting of methyl, ethyl, propyl, iso-propyl, n-butyl, isobutyl, sec-butyl, and t-butyl.

Typical examples of an alkyl group may be a methyl group, an ethyl group, a propyl group, an isopropyl group, a butyl group, an isobutyl group, a t-butyl group, a pentyl group, a hexyl group, an ethenyl group, a prophenyl group, a butenyl group, a cyclopropyl group, a cyclobutyl group, a cyclopentyl group, a cyclohexyl group, and the like.

The "alkene group" may refer to a substituent of at least one carbon-carbon double bond of at least two carbons, and the "alkyne group" may refer to a substituent of at least one carbon-carbon triple bond of at least two carbons.

The "aromatic group" may refer to a substituent including all element of the cycle having p-orbitals which form conjugation. Examples may include an aryl group and a heteroaryl group.

The "aryl group" may refer to a monocyclic or fused ring (e.g., a plurality of rings sharing adjacent pairs of carbon atoms).

The "heteroaryl group" may refer to an aryl group including 1 to 3 hetero atoms selected from the group consisting of N, O, S, and P. When the heteroaryl group is a fused ring, each ring may include 1 to 3 hetero atoms.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Positive Electrode Composition for Lithium Secondary Battery

The positive electrode composition for a lithium secondary battery according to one embodiment includes a binder. The binder improves adherence of positive active material particles of a lithium secondary battery with one another, and with a current collector. The binder may include a fluorine resin, for example, polyvinylidene fluoride (PVdF).

The polyvinylidene fluoride includes monomers forming a molecular structure, and the monomers include a fluoro (F) atom having high electronegativity and a hydrogen (H) atom having low electronegativity and thus, have a large dipole moment. The polyvinylidene fluoride used as an electrode binder for a lithium secondary battery has g a number average molecular weight ranging from about 130,000 to about 220,000 and forms a chain. The polyvinylidene fluoride has a phase that α and β types are mixed during the preparation. When the polyvinylidene fluoride is cast into a solvent, the α phase is structurally distorted into a γ phase.

In general, a method of using a polyvinylidene fluoride binder in a positive electrode is performed by dissolving the polyvinylidene fluoride binder in an N-methyl pyrrolidone (NMP) solvent to prepare a solution and adding an active material to the solution. The mixture that the active material, a conductive material, and the binder are evenly dispersed in the NMP is a slurry. The slurry is coated to have a predetermined thickness on a current collector and dried to form a positive active material layer in the form of a solid coated on the current collector.

When the slurry is dried on the current collector, the binder among the active material particles or between the active material particles and the current collector is transformed from a liquid phase into a solid phase and thus, has adherence. Herein, the polyvinylidene fluoride is transformed into a β or γ phase. The β or γ phased polyvinylidene fluoride includes many hydrogen bonds among the molecules, since fluorine atoms are arranged in one direction and largely increases a dipole moment.

Herein, an alkali component such as a hydroxide ion (OH⁻) and the like remaining in the slurry removes hydrogen from the binder, and the hydrogen is bonded with fluorine due to its polarity and released as fluoric acid (HF) and the like, while carbon lacking of ions shares electrons and forms double bonds. The double bonds are cross-linked by oxygen, moisture, or other compounds promoting cross-linking and resultantly gelate the slurry. The gelation makes uniform coating of the slurry on a current collector impossible and decreases adherence among the active particles or between the particles and the current collector.

Accordingly, one embodiment provides a positive electrode composition for a lithium secondary battery including a compound reacting with hydroxide ions (OH⁻) in the positive electrode composition and decreasing concentration of the hydroxide ions (OH⁻) in order to prevent the slurry gelation.

According to one embodiment, a positive electrode composition for a lithium secondary battery includes a positive active material, a binder and compound represented by the following Chemical Formula 1.

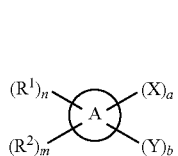

[Chemical Formula 1]

In Chemical Formula 1, A is a $C_3$ to $C_{30}$ cyclic organic group.

X is a substituent having a carbonyl group, for example —C(=O)R. R is hydrogen, deuterium, a substituted or unsubstituted $C_1$ to $C_{10}$ alkyl group, a substituted or unsubstituted $C_3$ to $C_{10}$ cycloalkyl group, a substituted or unsubstituted $C_6$ to $C_{30}$ aryl group, or a substituted or unsubstituted $C_3$ to $C_{30}$ heteroaryl group.

Y is a substituent capable of forming a hydrogen bond, —OH, —NHR', —NH(C=O)R'' or —NH(C=S)R''', wherein R', R'', and R''' are independently hydrogen, deuterium, a substituted or unsubstituted $C_1$ to $C_{10}$ alkyl group, a substituted or unsubstituted $C_3$ to $C_{10}$ cycloalkyl group, a substituted or unsubstituted $C_6$ to $C_{30}$ aryl group, or a substituted or unsubstituted $C_3$ to $C_{30}$ heteroaryl group.

$R^1$ and $R^2$ are independently hydrogen, deuterium, a halogen, a cyano group, a nitro group, a substituted or unsubstituted $C_1$ to $C_{10}$ amine group, a substituted or unsubstituted $C_1$ to $C_{10}$ alkyl group, a substituted or unsubstituted $C_1$ to $C_{10}$ alkoxy group, a substituted or unsubstituted $C_2$ to $C_{10}$ alkenyl group, a substituted or unsubstituted $C_3$ to $C_{10}$ cycloalkyl group, a substituted or unsubstituted $C_6$ to $C_{30}$ aryl group, a substituted or unsubstituted $C_6$ to $C_{20}$ arylamine group, a substituted or unsubstituted $C_5$ to $C_{20}$ heteroarylamine group, or a substituted or unsubstituted $C_2$ to $C_{30}$ heteroaryl group, or $R^1$ and $R^2$ are linked to each other to form a fused ring.

$1 \le a$, $1 \le b$, $0 \le n$, and $0 \le m$, provided that n+m+a+b does not exceed valence of A.

The compound represented by the above Chemical Formula 1 reacts with a hydroxide ion (OH⁻) inside the positive electrode composition and thus decreases a concentration of a hydroxide ion (OH⁻) to prevent gelation. In one embodiment, X of the above Chemical Formula 1 may be a substituent including a carbonyl group and the carbonyl group may cause a nucleophilic addition reaction (hereinafter, referred to "carbonyl addition reaction") with the hydroxide ion (OH⁻) to a carbonyl group. As a result, a (C=O) double bond of the carbonyl group is open and a center carbon atom may transit from sp2 to sp3. For example, X may be —(C=O)H, or —(C=O)CH₃, and reaction mechanisms are shown in the following Reaction Scheme 1 and Reaction Scheme 2, respectively.

[Reaction Scheme 1]

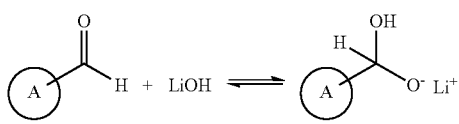

[Reaction Scheme 2]

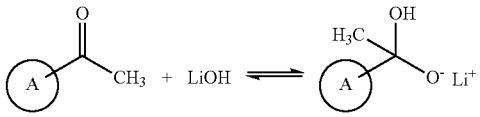

X may include an electron withdrawing group. Thus, reactivity of the carbonyl addition reaction may be improved. For example, X may be —C(=O)R, wherein R is a $C_1$ to $C_{10}$ alkyl group in which at least one hydrogen is substituted with a halogen group. The halogen group may be F, Cl, Br, I, and the like, and in one embodiment, a fluoro group (F) may be preferable.

The fluoro group is a strong electron withdrawing group and thus, withdraws an electronic cloud from the carbonyl group, and accordingly, carbon in the carbonyl group lacks of electrons. The electron-lacking carbon in the carbonyl group rapidly more rapidly has a nucleophilic addition reaction with a hydroxide ion (OH⁻) as a nucleophile. Examples of X may include, —C(=O)CH₂F, —C(=O)CHF₂, —C(=O)CF₃, —C(=O)CH₂CF₃, —C(=O)CH₂CH₂CF₃, and the like.

Y is a substituent capable of forming a hydrogen bond, —OH, —NHR', —NH(C=O)R'' or —NH(C=S)R''', wherein R', R'', and R''' are independently hydrogen, deuterium, a substituted or unsubstituted $C_1$ to $C_{10}$ alkyl group, a substituted or unsubstituted $C_3$ to $C_{10}$ cycloalkyl group, a substituted or unsubstituted $C_6$ to $C_{30}$ aryl group, or a substituted or unsubstituted $C_3$ to $C_{30}$ heteroaryl group.

The Y may be a substituent including hydrogen atoms capable of having a hydrogen bond with oxygen ions (—O⁻) in the X or oxygen of a hydroxide group (—OH) after the carbonyl addition reaction. The hydrogen bond may be an intra molecular hydrogen bond. The hydrogen bond stabilizes a compound represented by Chemical Formula 1 after the carbonyl addition reaction. Accordingly, hydroxide ions (OH⁻) in the positive electrode composition are fixed into the compound represented by Chemical Formula 1 and have a less concentration in the positive electrode composition and thus, may prevent gelation of the positive electrode slurry. For example, the following Reaction Scheme 3 shows a mechanism that the X is —(C=O)H, and the Y is —OH. In Reaction Scheme 3, a dotted line denotes the hydrogen bond.

[Reaction Scheme 3]

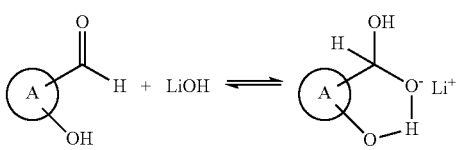

In one embodiment, Y may be positioned at an alpha position relative to X. In this specification, an "alpha position" denotes a position substituted for carbon right next to a carbon bonded to the substituent bonded in an aromatic cycle and/or an aliphatic cycle. For example, the alpha position of benzene may be an ortho position. When the Y is the alpha position for the X, the hydrogen bond may be better formed and effectively prevent gelation of the slurry.

Y may include an electron-withdrawing group. Herein, the hydrogen bond becomes stronger and more stabilizes a reactant and thus, may further improve the carbonyl addition reaction rate.

In one embodiment, Y may be —OH, —NHR', —NH(C=O)R", or —NH(C=S)R'", wherein R', R", and R'" are independently a $C_1$ to $C_{10}$ alkyl group substituted with a halogen group instead of at least one hydrogen. Examples of the halogen group may include F, Cl, Br, I, and the like, and in one embodiment, a fluoro group (F) may be preferable.

For example, Y may be —OH, —NHC(=O)CH$_3$, —NHC(=O)CH$_2$F, —NHC(=O)CHF$_2$, —NHC(=O)CF$_3$, —NHC(=O)CH$_2$CF$_3$, —NHCH$_3$, —NHCH$_2$F, —NHCHF$_2$, —NHCF$_3$, or —NHCH$_2$CF$_3$.

The A may be a $C_3$ to $C_{30}$ cyclic organic group. The A may have various ring structures, for example, aromatic or cyclic, performing function of the X and Y.

In one embodiment, the $C_3$ to $C_{30}$ cyclic organic group may be selected from an aromatic monocyclic organic group, an aromatic multicyclic organic group, an aromatic hetero monocyclic organic group, an aromatic hetero multicyclic organic group, an aliphatic monocyclic organic group, an aliphatic multicyclic organic group, an aliphatic hetero monocyclic organic group, an aliphatic hetero multicyclic organic group; an organic group including the foregoing cyclic groups linked by condensation; and an organic group including the foregoing cyclic groups linked through a linking group.

In one embodiment, the $C_3$ to $C_{30}$ cyclic organic group may be a hexagonal or pentagonal ring.

In one embodiment, the $C_3$ to $C_{30}$ cyclic organic group may be a phenyl group, a naphthyl group, an anthracenyl group, a naphtacenyl group, a chrysenyl group a perylenyl group, a coronenyl group, a corannulenyl group, a phenanthrenyl group, a furanyl group, a pyrrolyl group, a pyridinyl group, a pyrimidinyl group, a pyrazolyl group, an imidazolyl group, an oxazolyl group, an isoxazolyl group, an isothiazolyl group, a thiazolyl group, an indolyl group, and the like.

The $C_3$ to $C_{30}$ cyclic organic group may be a cycloalkyl group, or a cycloalkenyl group. Specifically, the $C_3$ to $C_{30}$ cyclic organic group may be a cyclohexyl group, a cyclopentyl group, a cyclohexenyl group, or a cyclopentenyl group.

$R^1$ and $R^2$ are independently hydrogen, deuterium, a halogen, a cyano group, a nitro group, a substituted or unsubstituted $C_1$ to $C_{10}$ amine group, a substituted or unsubstituted $C_1$ to $C_{10}$ alkyl group, a substituted or unsubstituted $C_1$ to $C_{10}$ alkoxy group, a substituted or unsubstituted $C_2$ to $C_{10}$ alkenyl group, a substituted or unsubstituted $C_3$ to $C_{10}$ cycloalkyl group, a substituted or unsubstituted $C_6$ to $C_{30}$ aryl group, a substituted or unsubstituted $C_6$ to $C_{20}$ arylamine group, a substituted or unsubstituted $C_5$ to $C_{20}$ heteroarylamine group, or a substituted or unsubstituted $C_2$ to $C_{30}$ heteroaryl group, or R' and $R^2$ are linked to each other to form a fused ring.

For example, $R^1$ and $R^2$ may be hydrogen.

The $R^1$ and $R^2$ may be appropriately adjusted to improve reactivity, stability, and the like of the compound.

The a may be 1≤a, and the b may be 1≤b. In addition, the n may be 0≤n, and the m may be 0≤m. n+m+a+b does not exceed valence of A. In other words, the number of X and Y may be appropriately adjusted depending on valence of the core A and a required characteristic.

For example, the compound represented by the above Chemical Formula 1 may be one of compounds represented by Chemical Formulae 2 to 9.

[Chemical Formula 2]

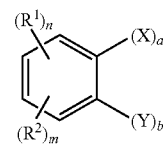

[Chemical Formula 3]

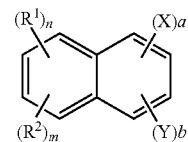

[Chemical Formula 4]

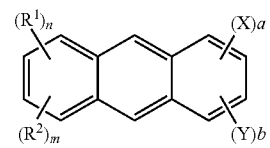

[Chemical Formula 5]

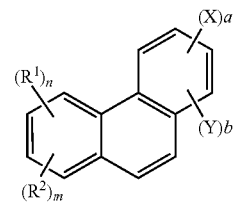

[Chemical Formula 6]

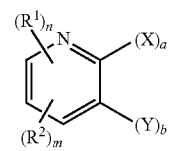

[Chemical Formula 7]

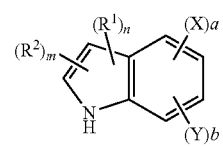

[Chemical Formula 8]

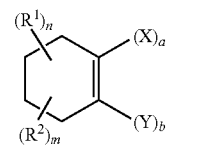

[Chemical Formula 9]

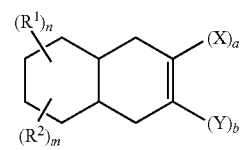

In Chemical Formulae 2 to 9, X, Y, $R^1$, $R^2$, a, b, n, and m are the same as defined above.

In another embodiment, the compound represented by the above Chemical Formula 1 may be one of compounds represented by Chemical Formulae 10 to 13, but is not limited thereto.

[Chemical Formula 10]

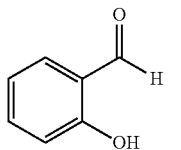

[Chemical Formula 11]

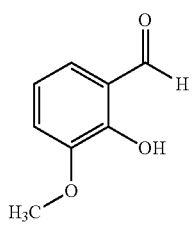

[Chemical Formula 12]

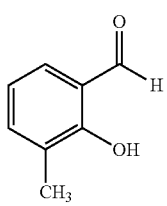

[Chemical Formula 13]

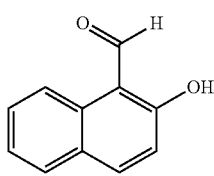

The compound represented by the above Chemical Formula 1 may be included in an amount of about 0.01 wt % to about 5 wt %, and specifically about 0.01 wt % to about 4 wt %, about 0.01 wt % to about 3 wt %, about 0.01 wt % to about 2 wt %, about 0.01 wt % to about 1 wt %, about 0.05 wt % to about 5 wt %, about 0.05 wt % to about 4 wt %, about 0.05 wt % to about 3 wt %, about 0.05 wt % to about 2 wt %, about 0.05 wt % to about 1 wt %, about 0.01 wt % to about 1 wt % based on 100 wt % of the positive electrode composition for a lithium secondary battery. When the compound represented by the above Chemical Formula 1 is included within the range, gelation of slurry may be effectively prevented without deteriorating battery capacity.

The positive active material may be a compound that is capable of intercalating and deintercalating lithium reversibly, that is a lithiated intercalation compound. For example, the positive active material may have a layered structure, a spinel-based structure, an olivine-based structure, or a combination thereof. The positive active material may be at least one selected from lithium cobalt-based oxide, lithium nickel cobalt manganese-based oxide, lithium nickel cobalt aluminum-based oxide, and lithium phosphate-based oxide.

For example, the positive active material may be at least one composite oxide including a metal selected from cobalt, manganese, nickel, or a combination thereof, and lithium. Specific examples may include compounds represented by the following chemical formulae.

$Li_aA'_{1-b}R'''_bD_2$ ($0.90 \leq a \leq 1.8$ and $0 \leq b \leq 0.5$); $Li_aE_{1-b}R'''_bO_{2-c}D_c$ ($0.90 \leq a \leq 1.8$, $0 \leq b \leq 0.5$ and $0 \leq c \leq 0.05$); $LiE_{2-b}R'''_bO_{4-c}D_c$ ($0 \leq b \leq 0.5$, $0 \leq c \leq 0.05$); $Li_aNi_{1-b-c}Co_bR'''_cD_\alpha$ ($0.90 \leq a \leq 1.8$, $0 \leq b \leq 0.5$, $0 \leq c \leq 0.05$ and $0 < \alpha \leq 2$); $Li_aNi_{1-b-c}Co_bR'''_cO_{2-\alpha}Z_\alpha$ ($0.90 \leq a \leq 1.8$, $0 \leq b \leq 0.5$, $0 \leq c \leq 0.05$ and $0 < \alpha < 2$); $Li_aNi_{1-b-c}Co_bR'''_cO_{2-\alpha}Z_2$ ($0.90 \leq a \leq 1.8$, $0 \leq b \leq 0.5$, $0 \leq c \leq 0.05$ and $0 < \alpha < 2$); $Li_aNi_{1-b-c}Mn_bR'''_cD_\alpha$ ($0.90 \leq a \leq 1.8$, $0 \leq b \leq 0.5$, $0 \leq c \leq 0.05$ and $0 < \alpha \leq 2$); $Li_aNi_{1-b-c}Mn_bR'''_cO_{2-\alpha}Z_\alpha$ ($0.90 \leq a \leq 1.8$, $0 \leq b \leq 0.5$, $0 \leq c \leq 0.05$ and $0 < \alpha < 2$); $Li_aNi_{1-b-c}Mn_bR'''_cO_{2-\alpha}Z_2$ ($0.90 \leq a \leq 1.8$, $0 \leq b \leq 0.5$, $0 \leq c \leq 0.05$ and $0 < \alpha < 2$); $Li_aNi_bE_cG_dO_2$ ($0.90 \leq a \leq 1.8$, $0 \leq b \leq 0.9$, $0 \leq c \leq 0.5$ and $0.001 \leq d \leq 0.1$.); $Li_aNi_bCo_cMn_dGeO_2$ ($0.90 \leq a \leq 1.8$, $0 \leq b \leq 0.9$, $0 \leq c \leq 0.5$, $0 \leq d \leq 0.5$ and $0.001 \leq e \leq 0.1$.); $Li_aNiG_bO_2$ ($0.90 \leq a \leq 1.8$ and $0.001 \leq b \leq 0.1$.); $Li_aCoG_bO_2$ ($0.90 \leq a \leq 1.8$ and $0.001 \leq b \leq 0.1$.); $Li_aMnG_bO_2$ ($0.90 \leq a \leq 1.8$ and $0.001 \leq b \leq 0.1$.); $Li_aMn_2G_bO_4$ ($0.90 \leq a \leq 1.8$ and $0.001 \leq b \leq 0.1$.); $QO_2$; $QS_2$; $LiQS_2$; $V_2O_5$; $LiV_2O_5$; $LiTO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$.

In the above chemical formulae, A' is Ni, Co, Mn, or a combination thereof; R' is Al, Ni, Co, Mn, Cr, Fe, Mg, Sr, V, a rare earth element, or a combination thereof; D is O, F, S, P, or a combination thereof; E is Co, Mn, or a combination thereof; Z is F, S, P or combination thereof; G is Al, Cr, Mn, Fe, Mg, La, Ce, Sr, V, or a combination thereof; Q is Ti, Mo, Mn, or a combination thereof; T is Cr, V, Fe, Sc, Y, or a combination thereof; and J is V, Cr, Mn, Co, Ni, Cu, or a combination thereof.

The compounds may have a coating layer on the surface, or may be mixed with another compound having a coating layer. The coating layer may include at least one coating element compound selected from the group consisting of an oxide of a coating element, a hydroxide of a coating element, an oxyhydroxide of a coating element, an oxycarbonate of a coating element, and a hydroxyl carbonate of a coating element. The compound for the coating layer may be amorphous or crystalline. The coating element included in the coating layer may include Mg, Al, Co, K, Na, Ca, Si, Ti, V, Sn, Ge, Ga, B, As, Zr, or a mixture thereof. The coating layer may be disposed in a method having no adverse influence on properties of a positive active material by using these elements in the compound. For example, the method may include any coating method such as spray coating, dipping, and the like, but is not illustrated in more detail since it is well-known to those who work in the related field.

Specifically, the positive active material may be a nickel rich-based compound. In other words, the positive active material is a nickel-containing lithium metal composite oxide. The lithium metal composite oxide may include nickel in an amount of greater than about 60 mol %. Specifically, the nickel may be included in an amount ranging from greater than or equal to about 70 mol % or greater than or equal to about 80 mol %.

The nickel rich-based positive active material absorbs better than other active materials and thus, may better produce an alkali component such as LiOH and the like. In other words, the nickel rich-based positive active material has higher pH than the other active materials. Accordingly, when the positive electrode composition for a lithium secondary battery includes the nickel rich-based positive active material, hydrogen atoms of the binder in the slurry may be easily bonded with OH⁻, promoting gelation of the slurry. According to the present embodiments, the positive electrode composition may effectively prevent gelation of slurry by adding a compound represented by the above Chemical Formula 1 to the positive electrode composition for a lithium secondary battery including the nickel rich-based positive active material.

The binder may include, for example, polyvinylidene fluoride but is not limited thereto and may include all the generally-used binders used in an art related to the present embodiments. Examples of the binder may include carboxymethylcellulose, hydroxyethylcellulose, hydroxypropylcellulose, hydroxypropylmethylcellulose, polyvinylidene fluoride, polytetrafluoroethylene, polyethylene, polypropylene, styrene-butadiene a rubber, polybutadiene, a butyl rubber, a fluorine rubber, polyethyleneoxide, polyvinylalcohol, poly(meth)acrylic acid and a salt thereof, polyvinylpyrrolidone, polyepichlorohydrine, polyphosphazene, polyacrylonitrile, polystyrene, polyvinylpyridine, chlorosulfonated polyethylene, a latex, a polyester resin, an acrylic resin, a phenol resin, an epoxy resin, a polymer of propylene and C2 to C8 olefin, a copolymer of (meth)acrylic acid and (meth)acrylic acid alkylester, and a combination thereof.

Specifically, the binder may be a fluorine-based resin. In other words, the binder may be a polymer including a fluoro group substituted for at least one hydrogen. When the binder includes the fluoro group, oxygen atoms may be further released in the binder due to polarity of the fluoro group, promoting gelation of the slurry. Accordingly, the compound represented by the above Chemical Formula 1 is added to the positive electrode composition including the fluorine-based binder to effectively prevent the slurry gelation.

The positive electrode composition for a lithium secondary battery may further include a conductive material.

The conductive material provides an electrode with conductivity. Any electrically conductive material may be used as a conductive material unless it causes a chemical change. Examples of the conductive material include one or more natural graphite, artificial graphite, carbon black, acetylene black, ketjen black, a carbon fiber, carbon nanotube, and the like, a metal powder or a metal fiber including copper, nickel, aluminum, silver, and the like, a conductive polymer such as a polyphenylene derivative.

Lithium Secondary Battery

In one embodiment, a lithium secondary battery includes a positive electrode including a current collector and the positive electrode composition for a lithium secondary battery disposed on at least one side of the current collector; a negative electrode including a negative active material; a separator interposed between the positive electrode and negative electrode; and an electrolyte.

The FIGURE shows a representative structure of a lithium secondary battery according to one embodiment. As shown in FIG. 1, the lithium secondary battery 1 includes a battery case including a positive electrode 3, a negative electrode 2, and a separator 4 interposed between the positive electrode 3 and negative electrode 2, and an electrolyte impregnated therein, and a sealing member 6 sealing the battery case 5.

The positive electrode composition is the same as described above. The current collector may include Al, but is not limited thereto.

The negative electrode includes a current collector and a negative active material layer disposed on the current collector, and the negative active material layer includes a negative active material.

The negative active material includes a material that reversibly intercalates/deintercalates lithium ions, a lithium metal, a lithium metal alloy, a material capable of doping lithium, or a transition metal oxide.

The material that reversibly intercalates/deintercalates lithium ions includes carbon materials. The carbon material may be any generally-used carbon-based negative active material in a lithium ion secondary battery. Examples of the carbon material include crystalline carbon, amorphous carbon, and a combination thereof. The crystalline carbon may be non-shaped, or sheet, flake, spherical, or fiber shaped natural graphite or artificial graphite. The amorphous carbon may be a soft carbon, a hard carbon, mesophase pitch carbonized product, fired coke, and the like.

The lithium metal alloy may include lithium and a metal selected from Na, K, Rb, Cs, Fr, Be, Mg, Ca, Sr, Si, Sb, Pb, In, Zn, Ba, Ra, Ge, Al, and Sn.

Examples of the material capable of doping and dedoping lithium include Si, $SiO_x$ (0<x<2), a Si—Y alloy (wherein Y is an element selected from an alkali metal, an alkaline-earth metal, Group 13 to 16 elements, a transition element, a rare earth element, and a combination thereof and not Si), Sn, $SnO_2$, a Sn—Y alloy (wherein Y is an element selected from an alkali metal, an alkaline-earth metal, a Group 13 element, a Group 14 element, a transition element, a rare earth element, and a combination thereof, and is not Sn), and the like. At least one of them may be mixed with $SiO_2$. The element Y may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, and a combination thereof.

The transition metal oxide may include vanadium oxide, lithium vanadium oxide, and the like.

The negative active material layer includes a binder, and optionally a conductive material.

The binder improves binding properties of the negative active material particles to each other and to a current collector. Examples of the binder may include polyvinylalcohol, carboxylmethylcellulose, hydroxypropylcellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material improves electrical conductivity of a negative electrode. Any electrically conductive material can be used as a conductive agent unless it causes a chemical change. Examples of the conductive material include a carbon-based material such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene; or a mixture thereof.

The current collector may be a copper foil, a nickel foil, a stainless steel foil, a titanium foil, a nickel foam, a copper foam, a polymer substrate coated with a conductive metal, or a combination thereof, but is not limited thereto.

The negative and positive electrodes may be manufactured in a method of preparing an electrode composition by mixing the active material, a conductive material, and a binder in a solvent and coating the composition on a current collector. The electrode manufacturing method is well known and thus, is not described in detail in the present specification. The solvent includes N-methylpyrrolidone and the like but is not limited thereto.

The electrolyte may include a non-aqueous organic solvent and a lithium salt.

The non-aqueous organic solvent plays a role of transferring ions taking part in the electrochemical reaction of a battery.

The non-aqueous organic solvent may include a carbonate-based, ester-based, ether-based, ketone-based, alcohol-based, or aprotic solvent. The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. The ester-based solvent may include methyl acetate, ethyl acetate, n-propyl acetate, dimethylacetate, methylpropinonate, ethylpropinonate, γ-butyrolactone, decanolide, valerolactone, mevalonolactone, caprolactone, and the like. The ether-based solvent may include dimethyl ether, dibutyl ether, tetraglyme, diglyme, dimethoxyethane, 2-methyltetrahydrofuran, tetrahydrofuran (THF), and the like. The ketone-based solvent may include cyclohexanone, and the like. The alcohol-based solvent may include ethanol, isopropylalcohol, and the like. The aprotic solvent include nitriles such as R—CN (wherein R is a C2 to C20 linear, branched, or cyclic hydrocarbon group, and may include one or more double bonds, one or more aromatic rings, or one or more ether bonds), amides such as dimethylformamide, dimethylacetamide, dioxolanes such as 1,3-dioxolane, sulfolanes, and the like.

The non-aqueous organic solvent may be used singularly or in a mixture. When the organic solvent is used in a mixture, its mixture ratio can be controlled in accordance with desirable performance of a battery.

The carbonate-based solvent may include a mixture of a cyclic carbonate and a linear carbonate. The cyclic carbonate and the linear carbonate are mixed together in a volume ratio of about 1:1 to about 1:9 as an electrolyte, the electrolyte may have enhanced performance.

In addition, the electrolyte of the present embodiments may be prepared by further adding the aromatic hydrocarbon-based solvent to the carbonate-based solvent. The carbonate-based solvent and the aromatic hydrocarbon-based solvent are mixed together in a volume ratio of about 1:1 to about 30:1.

The aromatic hydrocarbon-based organic solvent may be an aromatic hydrocarbon compound represented by the following Chemical Formula A.

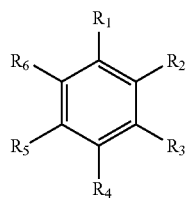

[Chemical Formula A]

In Chemical Formula A, $R_1$ to $R_6$ are independently hydrogen, a halogen, a $C_1$ to $C_{10}$ alkyl group, a haloalkyl group, or a combination thereof.

The aromatic hydrocarbon-based organic solvent may be selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, and a combination thereof.

The non-aqueous electrolyte may further include vinylene carbonate or an ethylene carbonate-based compound represented by the following Chemical Formula B in order to improve cycle-life of a battery.

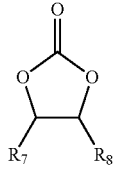

[Chemical Formula B]

In Chemical Formula B, $R_7$ and $R_8$ are independently hydrogen, a halogen, a cyano group (CN), a nitro group ($NO_2$), or a C1 to C5 fluoroalkyl group, provided that at least one of $R_7$ and $R_8$ is a halogen, a cyano group (CN), a nitro group ($NO_2$), or a C1 to C5 fluoroalkyl group.

Examples of the ethylene carbonate-based compound include difluoro ethylenecarbonate, chloroethylene carbonate, dichloroethylene carbonate, bromoethylene carbonate, dibromoethylene carbonate, nitroethylene carbonate, cyanoethylene carbonate or fluoroethylene carbonate, and the like. The use amount of such an additive for improving cycle life may be adjusted within an appropriate range.

The lithium salt is dissolved in the non-aqueous solvent and supplies lithium ions in a lithium secondary battery, and basically operates the lithium secondary battery and improves lithium ion transfer between positive and negative electrodes. The lithium salt include at least one supporting salt selected from $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2)(C_yF_{2y+1}SO_2)$ (wherein, x and y are natural numbers), LiCl, LiI, $LiB(C_2O_4)_2$ (lithium bis(oxalato) borate, LiBOB), and a combination thereof. The lithium salt may be used in a concentration of about 0.1 to about 2.0M. When the lithium salt is included within the above concentration range, it may electrolyte performance and lithium ion mobility due to optimal electrolyte conductivity and viscosity.

A separator may be present between the positive electrode and negative electrode depending on a kind of a lithium secondary battery. Such a separator may include polyethylene, polypropylene, polyvinylidene fluoride or a multilayer thereof, for example a mixed multilayer such as a polyethylene/polypropylene double-layered separator, polyethylene/polypropylene/polyethylene triple-layered separator, polypropylene/polyethylene/polypropylene triple-layered separator, and the like.

A lithium secondary battery may be classified as a lithium ion battery, a lithium ion polymer battery, and a lithium polymer battery according to the presence of a separator and the kind of an electrolyte used therein. The lithium secondary battery may have a variety of shapes and sizes and thus, may include a cylindrical, prismatic, coin, or pouch-type battery and a thin film type or a bulky type in size. The structure and fabricating method for a lithium ion battery pertaining to the present embodiments are well known in the art.

The following examples illustrate the present embodiments in more detail. These examples, however, should not in any sense be interpreted as limiting the scope of the present embodiments.

Fabrication of Positive Active Material Composition for Lithium Secondary Battery

EXAMPLE 1

96 wt % of $LiNi_{0.84}Co_{0.5}Al_{0.01}O_2$ (NCA020, Ecopro Co. Ltd.) as a positive active material, 2 wt % of denka black as a conductive material, and 2 wt % of polyvinylidene fluoride (solef6020) as a binder were mixed to prepare a mixture 1, and 0.1 wt % of salicyl aldehyde (2-hydroxybenzaldehyde, TCI Chemicals Ltd.) represented by the following formula 10 was added to the mixture 1. Then, an N-methylpyrrolidone solvent was added to the resulting mixture, preparing a slurry.

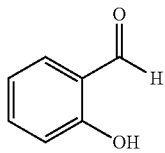

[Chemical Formula 10]

EXAMPLE 2

Slurry was prepared according to the same method as Example 1 except for using ortho-Vanillin represented by the following formula 11 instead of the salicyl aldehyde salicyl in Example 1.

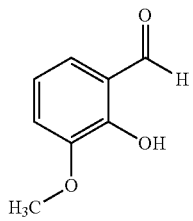

[Chemical Formula 11]

EXAMPLE 3

Slurry was prepared according to the same method as Example 1 except for using 3-Methylsalicylaldehyde represented by the following formula 12 instead of the salicyl aldehyde salicyl in Example 1.

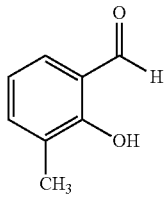

[Chemical Formula 12]

EXAMPLE 4

Slurry was prepared according to the same method as Example 1 except for using 2-Hydroxy-1-naphthaldehyde represented by the following formula 13 instead of the salicyl aldehyde salicyl in Example 1.

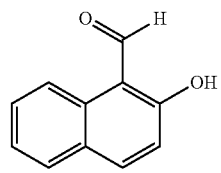

[Chemical Formula 13]

COMPARATIVE EXAMPLE 1

Slurry was prepared according to the same method as Example 1 except for using no salicyl aldehyde in Example 1.

Manufacture of Lithium Secondary Battery Cell (Half-cell)

EXAMPLE 5

The slurry according to Example 1 was coated on an aluminum foil, dried, and compressed, fabricating a positive electrode. A lithium metal was used as a counter electrode. Then, a polyethylene separator (18 μm) was interposed between the positive electrode and the counter electrode, and an electrolyte solution prepared by dissolving 1.15M of $LiPF_6$ in a mixed solvent of ethylene carbonate (EC) and ethylmethylcarbonate (EMC) (a volume ratio of 3:7) was injected, fabricating a 2016 coin cell (a half-cell).

EXAMPLES 6 TO 8

A coin cell was fabricated according to the same method as Example 5 except for using the slurries according to Examples 2 to 4 instead of the slurry according to Example 1.

COMPARATIVE EXAMPLE 2

A coin cell was fabricated according to the same method as Example 5 except for using the slurry of Comparative Example 1 instead of the slurry of Example 1.

EXPERIMENTAL EXAMPLE 1

Gelation Time of Slurry

The slurries according to Examples 1 to 4 and Comparative Example 1 were allowed to stand and gelated under an atmosphere of 22° C. of a temperature and 50% of relative humidity. The results are provided in the following Table 1.

TABLE 1

|  | Gelation time (day) |
| --- | --- |
| Example 1 | 7 days |
| Example 2 | 6.5 days |
| Example 3 | 5 days |
| Example 4 | 6 days |
| Comparative Example 1 | 1.5 days |

As shown in Table 1, the slurry according to Comparative Example 1 was gelated when 1.5 days passed, while the slurries according to Examples 1 to 4 were not gelated within 5 days. The slurry of Example 1 was gelated after 7 days. The result shows that the slurry according to the present embodiments had remarkably improved stability.

Referring to Table 1, the slurry included a compound represented by the above Chemical Formula 1 and thus, was effectively prevented from gelation and had improved stability and thus, processability.

EXPERIMENTAL EXAMPLE 2

Initial Discharge Capacity

The cells according to Examples 5 to 8 and Comparative Example 2 were experimented regarding charge and discharge. First of all, formation charge/discharge of the lithium secondary battery cells was twice performed with 0.1 C/0.1 C, and standard charge/discharge current density was once performed with 0.2 C/0.2 C. Then, the cells were measured regarding discharge capacity at 0.2 C charge/discharge. A difference between the 0.2 C discharge capacity of Example and the 0.2 C discharge capacity of Comparative Example was calculated. The results are provided in Table 2. The charge-ending voltage of the cells was 4.2V (Li/graphite), and the discharge-ending voltage thereof was 3.0 V (Li/graphite).

TABLE 2

| | Initial discharge capacity (mAh/g) | Difference of discharge capacity (mAh/g) |
| --- | --- | --- |
| Example 5 | 185.1 | −1.2 |
| Example 6 | 184.2 | −2.1 |
| Example 7 | 185.3 | −1 |
| Example 8 | 184.6 | −1.8 |
| Comparative Example 2 | 186.3 | — |

In general, when an additive is added to an electrode composition, the electrode composition remarkably deteriorates initial discharge capacity. However, as shown in Table 2, the positive electrode compositions including a compound represented by Chemical Formula 1 according to Examples 5 to 8 had not much deteriorated initial discharge capacity compared with the one including no additive according to Comparative Example 2. In other words, the cells according to Examples 5 to 8 had very little deteriorated initial discharge capacity.

Therefore, the positive electrode composition for a lithium secondary battery according to the present embodiments improved both stability and processability of slurry and simultaneously, deteriorated almost no initial discharge capacity of a lithium secondary battery including itself.

While the present embodiments have been described in connection with what is presently considered to be practical example embodiments, it is to be understood that the present embodiments are not limited to the disclosed embodiments, but, on the contrary, are intended to cover various modifications and equivalent arrangements included within the spirit and scope of the appended claims. Therefore, the aforementioned embodiments should be understood to be examples but not limiting the present embodiments in any way.

What is claimed is:

1. A positive electrode composition, comprising:
a positive active material;
a binder; and
a compound represented by the following Chemical Formula 1:

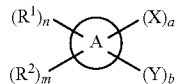

[Chemical Formula 1]

wherein, in Chemical Formula 1,
A is a $C_3$ to $C_{30}$ cyclic organic group,
X is —C(=O)R, wherein R is hydrogen, deuterium, a substituted or unsubstituted $C_1$ to $C_{10}$ alkyl group, a substituted or unsubstituted $C_3$ to $C_{10}$ cycloalkyl group, a substituted or unsubstituted $C_6$ to $C_{30}$ aryl group, or a substituted or unsubstituted $C_3$ to $C_{30}$ heteroaryl group,
Y is a substituent capable of forming a hydrogen bond, —OH, —NHR', —NH(C=O)R" or —NH(C=S)R''', wherein R', R", and R''' are independently hydrogen, deuterium, a substituted or unsubstituted $C_1$ to $C_{10}$ alkyl group, a substituted or unsubstituted $C_3$ to $C_{10}$ cycloalkyl group, a substituted or unsubstituted $C_6$ to $C_{30}$ aryl group, or a substituted or unsubstituted $C_3$ to $C_{30}$ heteroaryl group,
$R^1$ and $R^2$ are independently hydrogen, deuterium, a halogen, a cyano group, a nitro group, a substituted or unsubstituted $C_1$ to $C_{10}$ amine group, a substituted or unsubstituted $C_1$ to $C_{10}$ alkyl group, a substituted or unsubstituted $C_1$ to $C_{10}$ alkoxy group, a substituted or unsubstituted $C_2$ to $C_{10}$ alkenyl group, a substituted or unsubstituted $C_3$ to $C_{10}$ cycloalkyl group, a substituted or unsubstituted $C_6$ to $C_{30}$ aryl group, a substituted or unsubstituted C6 to C20 arylamine group, a substituted or unsubstituted $C_5$ to $C_{20}$ heteroarylamine group, or a substituted or unsubstituted $C_2$ to $C_{30}$ heteroaryl group, or $R^1$ and $R^2$ are linked to each other to form a fused ring,
1≤a, 1≤b, 0≤n, and 0≤m,
provided that n+m+a+b does not exceed valence of A,
wherein the compound represented by the above Chemical Formula 1 is included in an amount of about 0.01 wt % to about 0.1 wt % based on 100 wt % of the positive electrode composition.

2. The positive electrode composition of claim 1, wherein X is —C(=O)R, and wherein R is a $C_1$ to $C_{10}$ alkyl group substituted with at least one halogen group.

3. The positive electrode composition of claim 1, wherein Y is positioned at an alpha position relative to X.

4. The positive electrode composition of claim 1, wherein Y is a substituent capable of forming a hydrogen bond, —OH, —NHR', —NH(C=O)R" or —NH(C=S)R''', wherein R', R", and R''' are independently a $C_1$ to $C_{10}$ alkyl group substituted with at least one halogen group.

5. The positive electrode composition of claim 1, wherein the $C_3$ to $C_{30}$ cyclic organic group is selected from an aromatic monocyclic organic group, an aromatic multicyclic organic group, an aromatic hetero monocyclic organic group, an aromatic hetero multicyclic organic group, an aliphatic monocyclic organic group, an aliphatic multicyclic organic group, an aliphatic hetero monocyclic organic group, an aliphatic hetero multicyclic organic group; an organic group including the foregoing cyclic groups linked by condensation; and an organic group including the foregoing cyclic groups linked through a linking group.

6. The positive electrode composition of claim 1, wherein the $C_3$ to $C_{30}$ cyclic organic group is selected from a phenyl group, a naphthyl group, an anthracenyl group, a naphtacenyl group, a chrysenyl group, a perylenyl group, a coronenyl group, a corannulenyl group, a phenanthrenyl group, a furanyl group, a pyrrolyl group, a pyridinyl group, a pyrimidinyl group, a pyrazolyl group, an imidazolyl group, an oxazolyl group, an isoxazolyl group, an isothiazolyl group, a thiazolyl group, and an indolyl group.

7. The positive electrode composition of claim 1, wherein the compound represented by the above Chemical Formula 1 is one of the compounds represented by Chemical Formulae 2:

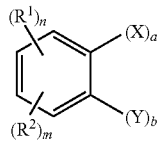

[Chemical Formula 2]

wherein in Chemical Formulae 2,

X is —C(=O)R, wherein R is hydrogen, deuterium, a substituted or unsubstituted $C_1$ to $C_{10}$ alkyl group, a substituted or unsubstituted $C_3$ to $C_{10}$ cycloalkyl group, a substituted or unsubstituted $C_6$ to $C_{30}$ aryl group or substituted or unsubstituted $C_3$ to $C_{30}$ heteroaryl group, Y is a substituent capable of forming a hydrogen bond, —OH, —NHR', —NH(C=O)R" or —NH(C=S)R''', wherein R', R", and R''' are independently hydrogen, deuterium, a substituted or unsubstituted $C_1$ to $C_{10}$ alkyl group, a substituted or unsubstituted $C_3$ to $C_{10}$ cycloalkyl group, a substituted or unsubstituted $C_6$ to $C_{30}$ aryl group, or a substituted or unsubstituted $C_3$ to $C_{30}$ heteroaryl group, $R^1$ and $R^2$ are independently hydrogen, deuterium, a halogen, a cyano group, a nitro group, a substituted or unsubstituted $C_1$ to $C_{10}$ amine group, a substituted or unsubstituted $C_1$ to $C_{10}$ alkyl group, a substituted or unsubstituted $C_1$ to $C_{10}$ alkoxy group, a substituted or unsubstituted $C_2$ to $C_{10}$ alkenyl group, a substituted or unsubstituted $C_3$ to $C_{10}$ cycloalkyl group, a substituted or unsubstituted $C_6$ to $C_{30}$ aryl group, a substituted or unsubstituted $C_6$ to $C_{20}$ arylamine group, a substituted or unsubstituted $C_5$ to $C_{20}$ heteroarylamine group, or a substituted or unsubstituted $C_2$ to $C_{30}$ heteroaryl group, or $R^1$ and $R^2$ are linked to each other to form a fused ring.

$1 \le a$, $1 \le b$, $0 \le n$, and $0 \le m$, provided that n+m+a+b does not exceed valence of A.

8. The positive electrode composition of claim 1, wherein the positive active material has a layered structure, a spinel-based structure, an olivine-based structure, or a combination thereof.

9. The positive electrode composition of claim 1, wherein the positive active material comprises at least one selected from lithium cobalt-based oxide, lithium nickel cobalt manganese-based oxide, lithium nickel cobalt aluminum-based oxide, and lithium phosphate-based oxide.

10. The positive electrode composition of claim 1, wherein
the positive active material is nickel-containing lithium metal composite oxide, and
the lithium metal composite oxide comprises nickel in an amount of greater than or equal to 60 mol %.

11. The positive electrode composition of claim 1, wherein the binder comprises carboxylmethylcellulose, hydroxyethylcellulose, hydroxypropylcellulose, hydroxypropylmethylcellulose, polyvinylidene fluoride, polytetrafluoroethylene, polyethylene, polypropylene, styrene-butadiene a rubber, polybutadiene, a butyl rubber, a fluorine rubber, polyethyleneoxide, polyvinylalcohol, poly(meth)acrylic acid and a salt thereof, polyvinylpyrrolidone, polyepichlorohydrine, polyphosphazene, polyacrylonitrile, polystyrene, polyvinylpyridine, chlorosulfonated polyethylene, a latex, a polyester resin, an acrylic resin, a phenol resin, an epoxy resin, a polymer of propylene and C2 to C8 olefin, a copolymer of (meth)acrylic acid and (meth)acrylic acid alkylester, and a combination thereof.

12. The positive electrode composition of claim 1, wherein the binder is a polymer substituted with a fluoro group instead of at least one hydrogen.

13. The positive electrode composition of claim 1, wherein the positive electrode composition for a lithium secondary battery further comprises a conductive material.

14. The positive electrode composition of claim 13, wherein the conductive material comprises at least one selected from natural graphite, artificial graphite, carbon black, acetylene black, ketjen black, a carbon fiber, carbon nanotube, a metal powder, a metal fiber, and a conductive polymer.

15. A lithium secondary battery, comprising
a current collector and
a positive electrode disposed on at least one side of the current collector;
a negative electrode including a negative active material;
a separator interposed between the positive electrode and negative electrode; and
an electrolyte;
wherein the positive electrode comprises:
a positive active material;
a binder; and
a compound represented by the following Chemical Formula 1:

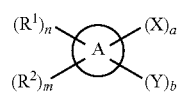

[Chemical Formula 1]

wherein, in Chemical Formula 1,

A is a $C_3$ to $C_{30}$ cyclic organic group,

X is —C(=O)R, wherein R is hydrogen, deuterium, a substituted or unsubstituted $C_1$ to $C_{10}$ alkyl group, a substituted or unsubstituted $C_3$ to $C_{10}$ cycloalkyl group, a substituted or unsubstituted $C_6$ to $C_{30}$ aryl group, or a substituted or unsubstituted $C_3$ to $C_{30}$ heteroaryl group, Y is a substituent capable of forming a hydrogen bond, —OH, —NHR', —NH(C=O)R" or —NH(C=S)R''', wherein R', R", and R''' are independently hydrogen, deuterium, a substituted or unsubstituted $C_1$ to $C_{10}$ alkyl group, a substituted or unsubstituted $C_3$ to $C_{10}$ cycloalkyl group, a substituted or unsubstituted $C_6$ to $C_{30}$ aryl group, or a substituted or unsubstituted $C_3$ to $C_{30}$ heteroaryl group, $R^1$ and $R^2$ are independently hydrogen, deuterium, a halogen, a cyano group, a nitro group, a substituted or unsubstituted $C_1$ to $C_{10}$ amine group, a substituted or unsubstituted $C_1$ to $C_{10}$ alkyl group, a substituted or unsubstituted $C_1$ to $C_{10}$ alkoxy group, a substituted or unsubstituted $C_2$ to $C_{10}$ alkenyl group, a substituted or unsubstituted $C_3$ to $C_{10}$ cycloalkyl group, a substituted or unsubstituted $C_6$ to $C_{30}$ aryl group, a substituted or unsubstituted C6 to C20 arylamine group, a substituted or unsubstituted $C_5$ to $C_{20}$ heteroarylamine group, or a substituted or unsubstituted $C_2$ to $C_{30}$ heteroaryl group, or $R^1$ and $R^2$ are linked to each other to form a fused ring, $1 \leq a$, $1 \leq b$, $0 \leq n$, and $0 \leq m$, provided that n+m+a+b does not exceed valence of A, wherein the compound represented by the above Chemical Formula 1 is included in an amount of about 0.01 wt % to about 0.1 wt % based on 100 wt % of the positive electrode composition.

16. The lithium secondary battery of claim 15, wherein X is —C(=O)R, and wherein R is a $C_1$ to $C_{10}$ alkyl group substituted with at least one halogen group.

17. The lithium secondary battery of claim 15, wherein Y is positioned at an alpha position relative to X.

18. The lithium secondary battery of claim 15, wherein Y is a substituent capable of forming a hydrogen bond, —OH, —NHR', —NH(C=O)R" or —NH(C=S)R'", wherein R', R", and R'" are independently a $C_1$ to $C_{10}$ alkyl group substituted with at least one halogen group.

* * * * *